(12) United States Patent
Konagaya

(10) Patent No.: US 6,552,778 B1
(45) Date of Patent: Apr. 22, 2003

(54) IMAGE READING DEVICE

(75) Inventor: Tatsuya Konagaya, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 189 days.

(21) Appl. No.: 09/630,392

(22) Filed: Aug. 1, 2000

(30) Foreign Application Priority Data

Aug. 2, 1999 (JP) .......................................... 11-218368
Sep. 2, 1999 (JP) .......................................... 11-248382

(51) Int. Cl.⁷ ........................ G03B 27/72; G03B 27/54; G06K 9/40
(52) U.S. Cl. ............................ 355/71; 355/67; 382/275
(58) Field of Search ............................. 355/30, 40, 43, 355/67, 71; 358/1.9, 474, 475; 382/275; 250/208.1, 340

(56) References Cited

U.S. PATENT DOCUMENTS 4,937,614 A * 6/1990 Tokuda ....................... 355/30
5,266,805 A * 11/1993 Edgar .......................... 250/330
5,969,372 A * 10/1999 Stavely et al. .......... 250/559.42
6,075,590 A * 6/2000 Edgar .......................... 250/330
6,323,967 B1 * 11/2001 Fujinawa ..................... 358/475

* cited by examiner

Primary Examiner—Rodney Fuller
(74) Attorney, Agent, or Firm—Sughrue Mion, PLLC

(57) ABSTRACT

A CCD scanner is provided with a halogen lamp for irradiating illumination light for reading a frame image on a photographic film, and a halogen lamp for irradiating infrared light via an infrared light filter for detecting scratches and the like on the film surface, and the optical axes of the respective light sources are coincided by a half mirror. A diffusion plate turret is also provided for selectively placing each of a plurality of diffusion plates for diffusing the illumination light near the photographic film. As a result, it is possible to perform both an image reading that doubles as an erasure of scratching on the film surface using visible light having different degrees of diffusion and a detection of scratches and the like using infrared light.

24 Claims, 11 Drawing Sheets

IMAGE READING DEVICE

BACKGROUND OF THE INVENTION

1. Field of the Invention

The present invention relates to an image reading device for obtaining image data by reading light transmitted through or reflected from a frame image recorded on an original.

2. Description of the Related Art

Recent years have seen the appearance of technology in which a frame image recorded on an original such as a photographic film is read photoelectrically by a reading sensor such as a CCD. Image processing, such as enlargement or reduction and various types of correction, is then carried out on the read digital image data, and an image is formed on a recording material using laser light modulated on the basis of the digital image data that has completed the image processing.

In technology such as this, in which a frame image is read digitally using a reading sensor such as a CCD, in order to obtain an accurate image reading, the frame image undergoes a preliminary reading (known as a prescan), and reading conditions (for example, the amount of light to be irradiated onto the frame image, the charge accumulation time of the CCD, and the like) are decided in accordance with the density and the like of the frame image. The frame image is then read once again on the basis of the decided reading conditions (known as a fine scan).

In these image readings, it is common for unevenness in the amount of light to be suppressed by diffusing the illumination light using a diffusion plate before irradiating it onto the film surface so that the entire image surface of the frame image is illuminated uniformly.

If, however, there is a scratch or the like present on the image surface, the light irradiated onto the film surface is scattered by the scratch. Consequently, the problem arises that, because correct detected amounts of light which match the image information cannot be obtained by the reading sensor, variations in the amount of light and the like occur and resultingly image defect portions such as black spots and the like appear on the image.

In order to reduce the effects on an image brought about by scratches on the film surface or by dust or the like present on the optical path between the light source and the film (these will be referred to below generically as "defect portions"), it is common to provide the above diffusion plate near the film (on the light source side) so as to diffuse the illumination light, and then read the frame image using this diffused light. As a result, scratches are erased optically such that defect portions appearing on the image do not stand out.

Alternatively, technology is also proposed in which an image is read using non-visible light that does not respond to image information of the color wavelengths (i.e. wavelengths of the visible light regions), such as infrared light (IR), so as to detect only the light scattering portions caused by defect portions. The image defect portions caused by the detected defect portions are then corrected by undergoing image processing digitally (electrically), based on image information peripheral to the defect portion.

However, the optical erasing of scratches using the above diffusion plate has the drawback that the scratch erasing capability thereof is not so good as compared with that of image correction using non-visible light, although the processing speed of the optical erasing of scratches is faster than the image correction using non-visible light because detection of defect portions using non-visible light (i.e. image reading) is not carried out in the optical erasing of scratches.

In contrast, electrical image correction using non-visible light enables highly accurate correction compared with optical scratch erasure, however, it has the drawback of a slow processing speed.

Moreover, in conventional electrical correction of an image using non-visible light, a diffusion plate (for suppressing unevenness in the light amounts) is generally positioned on the identical optical path used by the light source for illumination light and the light source for non-visible light, and is used in common by both light sources. As a result, the non-visible light also ends up being diffused by the diffusion plate intended for diffusing the illumination light. The drawback thus arises that the capability of detecting defect portions is reduced.

SUMMARY OF THE INVENTION

In consideration of the above, it is a first object of the present invention to provide an image reading device capable of reading an image in accordance with desired print conditions by using different scratch erasure methods for originals. It is a second object of the present invention to improve the defect portion detection performance when electrically correcting an image using non-visible light.

The first aspect of the present invention is an image reading device for reading an image recorded on an original according to predetermined different color wavelengths comprising: a light source for visible light for irradiating light of visible light regions onto a surface of the original in accordance with the color wavelengths so as to read image information of the original; a light source for non-visible light for irradiating light of non-visible light regions onto a surface of the original in order to detect scratching on the original or dust on the optical path; a diffusion member that is provided on an optical path of the light source for visible light and the light source for non-visible light and which makes the amount of light irradiated onto the surface of the original substantially uniform; and an image processing section for correcting the image information based on image defect portion detection information obtained by an image reading using light from the light source for non-visible light.

According to the first aspect, the light source for visible light and the light source for non-visible light are provided and a diffusion member is placed on the optical paths of both these light sources so as to make the amounts of light irradiated onto the surface of an original substantially uniform. In the image processing section, image information read using light from the light source for visible light is corrected, based on image defect portion detection information arising from scratching on the original or dust on the optical path obtained by an image reading using light from the light source for non-visible light.

Therefore, according to the first aspect, it is possible to use either of two types of scratch erasure method. Namely, if priority is to be given to the processing speed, even if the effects of scratching on the image are somewhat obvious, scratch erasure is carried out using diffused light. If priority is to be given to the image quality rather than to the processing speed, scratches are accurately corrected using scratch detection by non-visible light. By differentiating between the scratch control methods in this way, it is possible to read an image in accordance with the desired print conditions.

In the second aspect of the present invention, a preliminary reading (a prescan) of image information of the original is made using light of the light source for visible light and, based on the density of the image (the degree of the density) obtained from the reading, a switch is made between an image reading (scratch erasure) using the diffusion member using light from the light source for visible light, and image correction using light from the light source for non-visible light.

According to the second aspect, it is possible to switch flexibly between two types of scratch erasure method. For example, when the density of the image is high and the image reading speed is slow, by switching from image correction using light from a light source for non-visible light to an optical scratch erasure image reading using a light source for visible light, it is possible to prevent the reading speed from being slowed to an extreme. If, on the other hand, the density of the image is low, it is possible to employ a suitable combination of scratch erasure methods in accordance with the density, such as increasing the accuracy of the scratch erasure by using the two types of scratch erasure method in combination. Namely, in comparison with when the same one of these scratch erasure methods is always used, highly efficient image processing, in which the processing speed is balanced with the scratch erasure effect, can be achieved.

In the third aspect of the present invention, the diffusion member is provided in the vicinity of the original on the side on which each of the types of light is irradiated.

According to the third aspect, by placing the diffusion member in the vicinity of the original, it is possible to suppress loss of light from the light source and to increase the accuracy of the scratch erasure using diffused light.

In the fourth aspect of the present invention, the image reading device comprises a plurality of the diffusion members which each have a different degree of light diffusion and also contains diffusion member switching means which can selectively position the plurality of the diffusion members on the optical path.

According to the fourth aspect, because the image reading device is provided with a plurality of diffusion members which each diffuse light at a different degree (i.e. have a different degree of diffusion), and one of these plurality of diffusion members is selected and placed on the optical path by diffusion member switching means, it is possible to alter the degree of diffusion of light from a light source.

As a result, when scratch erasure is performed using diffused light, which is light from a light source for visible light that has been diffused, it is possible to make a choice between using a diffusion member having a high degree of diffusion and a diffusion member having a low degree of diffusion after considering the balance between processing speed and scratch erasure effect, and it is thus possible to make more precise processing settings. In this way, the available choices of scratch erasure processing are increased enabling a variety of print conditions to be met.

In the fifth aspect of the present invention, image information of the original is preliminarily read using light from the light source for visible light, and the plurality of diffusion members are switched based on image density obtained from the reading.

According to the fifth aspect, in the same way as in the above second aspect, image processing in which a balance is achieved between processing speed and image erasure effect is possible, compared with when processing is performed at a fixed degree of diffusion, by switching between the appropriate diffusion member on the basis of the image density. For example, by using a diffusion member having a low degree of diffusion when the image has a high density, excessive reduction in the amount of light can be prevented, and by using a diffusion member having a high degree of diffusion when the image has a low density, highly accurate scratch erasure can be performed.

In the sixth aspect of the present invention, a diffusion plate having a lower degree of diffusion than a diffusion member used for the light source for visible light does is placed on the optical path when the light source for non-visible light is used.

According to the sixth aspect, light from the light source for non-visible light is weakly diffused, although not to the same extent as light from the light source for visible light. Therefore, it is possible to suppress unevenness (shading) in the amount of light to a certain extent, even when an image is read using light from the light source for non-visible light. Consequently, when, for example, images read using the respective types of light each undergo shading correction, the difference between the shading shape of each image is reduced, and it is possible to suppress color unevenness and the like appearing on the image.

In the seventh aspect of the present invention, the diffusion member is placed only on the optical path of the light source for visible light.

In the eighth aspect of the present invention, the diffusion member is placed by diffusion member placement means on the optical path only when the light source for visible light is being used.

According to the seventh and eighth aspects, because only light from the light source for visible light is diffused by the diffusion means, unevenness in the amount of light when reading information of an original image can be suppressed. Moreover, because light from the light source for non-visible light is irradiated onto an original without being diffused, scattered light portions caused by scratching and the like can be detected even more accurately, thereby improving the image correction processing capability.

In the ninth aspect of the present invention, the image reading device is further provided with light shielding means for selectively shielding the light from the light source for visible light and the light from the light source for non-visible light which is irradiated onto a surface of the original.

According to the ninth aspect, because light from the light source for visible light and the light from the light source for non-visible light are selectively shielded by the shielding means, there is no need to control the turning on or off of each light source and, as a result, a lamp light source such as a halogen lamp or the like can be preferably used in the image reading device.

In the tenth aspect of the present invention, the light source for visible light is a group of light emitting elements comprising a plurality of light emitting elements for generating light in wavelengths different from each other, based on the color wavelengths.

According to the tenth aspect, because the light source for visible light is a group of light emitting elements, it is possible to decrease the amount of heat generated compared with a lamp light source such as a halogen lamp, for example, thereby allowing the light generating efficiency of the light source to be improved.

Further, according to the present aspect, it is possible to form a single light source by combining light emitting elements for visible light and light emitting elements for non-visible light and to switch between visible light and non-visible light by controlling light emission of each type of light emitting elements. Therefore, as a half-mirror or the like for aligning optical axes of the two types of light, the structure of the device as a whole can be made simpler.

DESCRIPTION OF THE PREFERRED EMBODIMENTS

The embodiments of the present invention will now be described with reference made to the drawings.
(First Embodiment)

Figure 1:
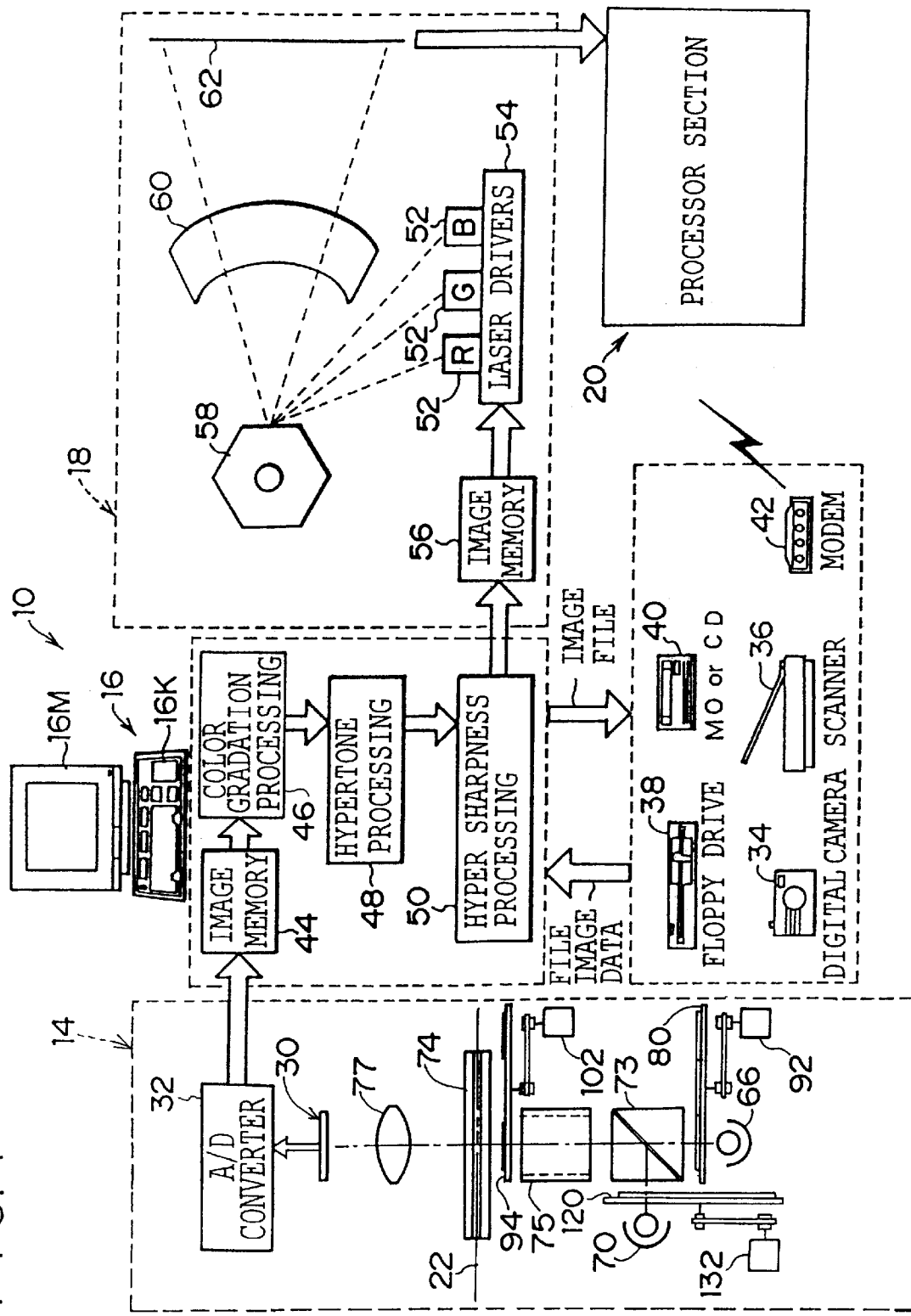
FIG. 1 a schematic structural view of a digital laboratory system according to the first embodiment of the present invention.
Figure 2:
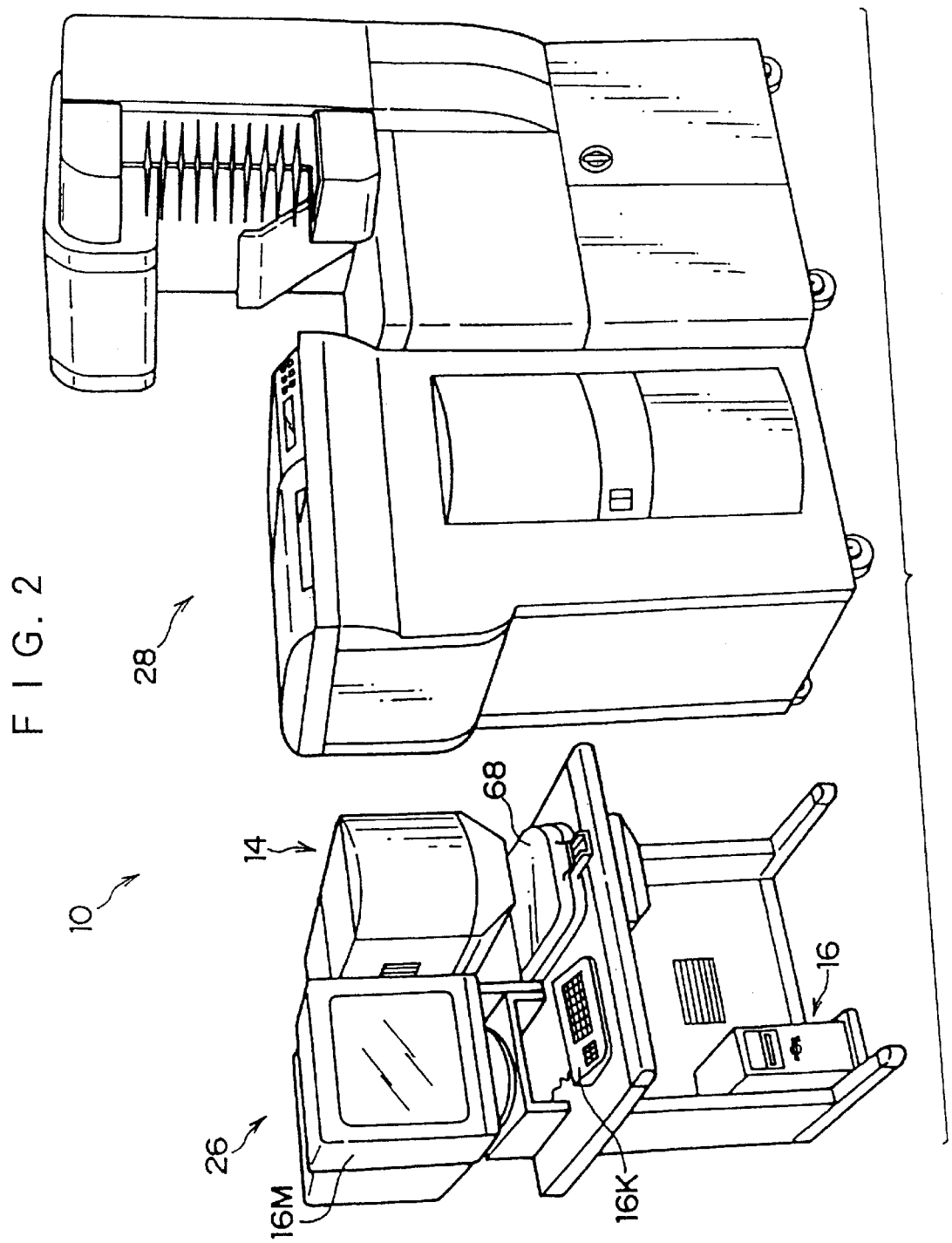
FIG. 2 is an exterior view of a digital laboratory system.

The schematic structure of the digital laboratory system 10 according to the first embodiment of the present invention is shown in FIGS. 1 and 2.

The digital laboratory system 10, as is shown in FIG. 1, is constructed so as to include a CCD scanner 14, an image processing section 16, a laser printer section 18, and a processor section 20. In this case, the CCD scanner 14 and the image processing section 16 are integrated as the input section 26 shown in FIG. 2, while the laser printer section 18 and the processor section 20 are integrated as the output section 28 shown in FIG. 2.

This CCD scanner 14 is used for reading frame images recorded on a photographic film such as a negative film or a reversal film, and can be used to read frame images on, for example, size 135 photographic film, size 110 photographic film, photographic film on which a transparent magnetic layer is formed (size 240 photographic film: known as APS film), size 120 photographic film and size 220 photographic film (brownie size). The CCD scanner 14 reads the above frame image to be read using a CCD sensor 30, and after undergoing A/D conversion in an A/D converter 32, the image data is output to the image processing section 16.

The image processing section 16 is constructed so as to receive image data output from the CCD scanner 14 (scan image data), and so that it can also receive from the outside image data obtained by photography with a digital camera 34 or the like, image data obtained from a reading by the (flatbed type) scanner 36 of an original (for example, a reflection original or the like), image data created on another computer and stored via a floppy disk drive 38, an MO drive, or a CD drive 40, and communication image data received via a modem 42.

The image processing section 16 stores input image data in image memory 44, and then performs image processings on the image data such as various types of correction including a color gradation processing section 46, a hypertone processing section 48, a hyper sharpness processing section 50, and the like. The image processings may further include, depending on the settings, scratch erasure correction for a film based on image data read by infrared light as described below. The image data is then output to the laser printer 18 as image data for recording. The image processing section 16 is also able to output to the outside (for example, by outputting it to a recording medium such as an FD, MO, or CD, or by transmitting it to another information processor via a communication line, or the like) the image data that has undergone image processing as an image file.

The laser printer section 18 is provided with R, G, and B laser light sources 52. The laser printer section 18 controls laser drivers 54 such that laser light that has been modulated in accordance with image data for recording input from the image processing section 16 (after being temporarily stored in the image memory 56) is irradiated onto photographic paper. An image is then recorded on photographic paper 62 by scan exposure (in the present embodiment, by an optical system using mainly a polygon mirror 58 and an fθ lens 60). The processor section 20 carries out color formation developing, bleaching/fixing, washing, and drying processings on the photographic paper 62 on which an image has been recorded by scan exposure in the laser printer section 18. As a result, an image is formed on the photographic paper 62. (Structure of the CCD scanner)

The structure of the CCD scanner 14 will now be described. Note that, in the present embodiment, a description is given of when a size 135 photographic film 22 is used in a digital laboratory system 10.

Figure 3:
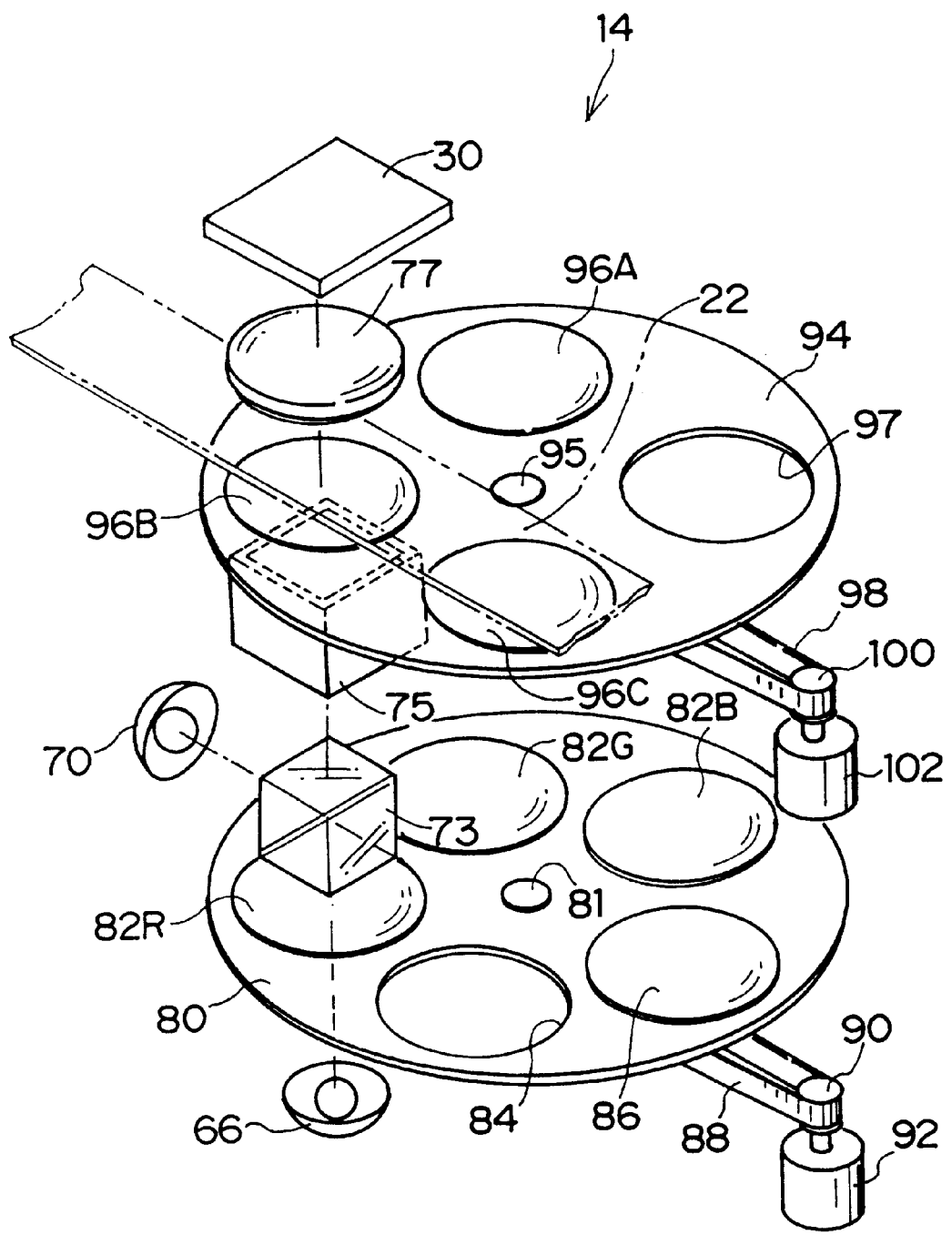
FIG. 3 is a perspective view showing the schematic structure of the optical system of a CCD scanner according to the first embodiment of the present invention.
Figure 4:
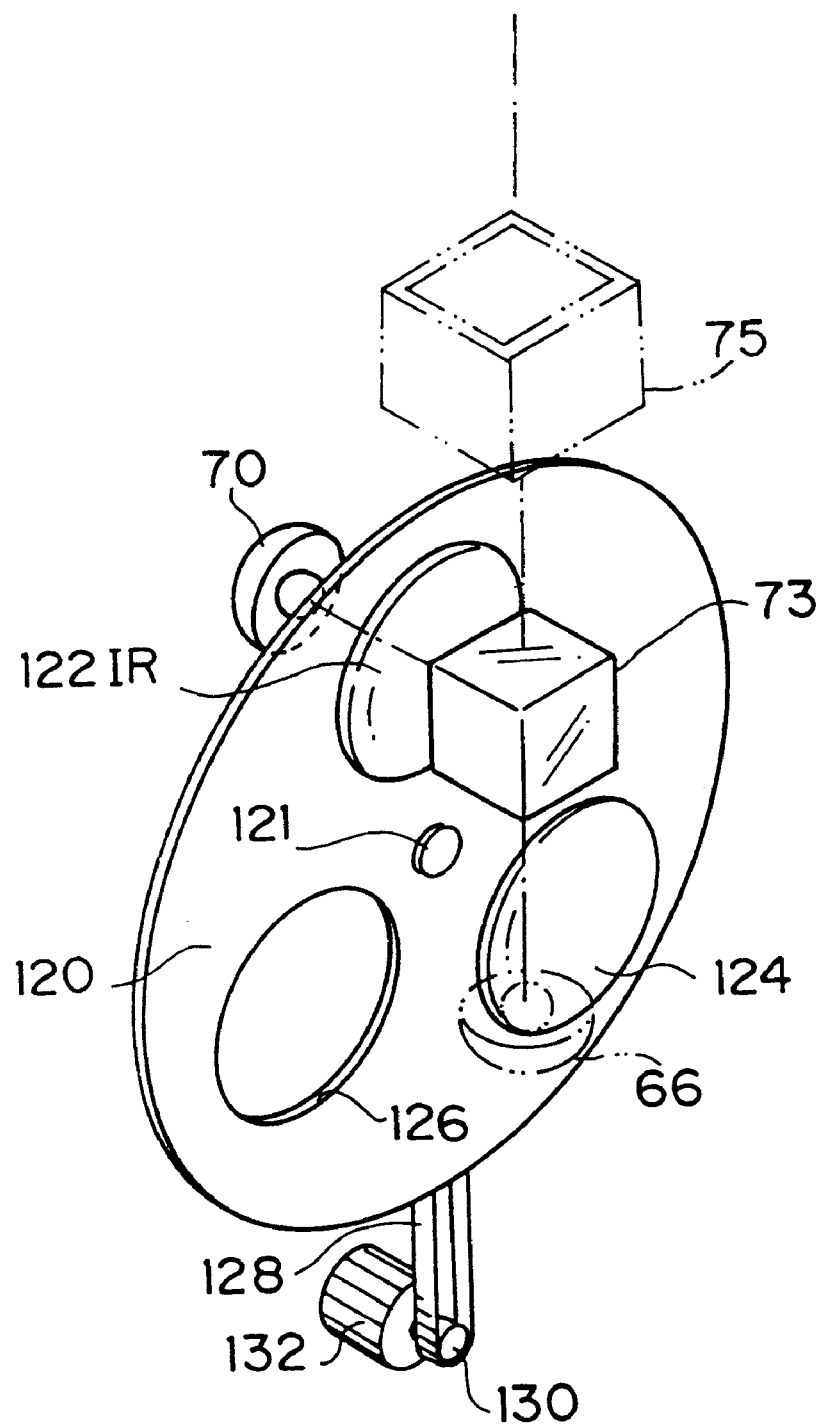
FIG. 4 is a perspective view showing the schematic structure of the vicinity of a halogen lamp used for infrared light of FIG. 3.
Figure 5:
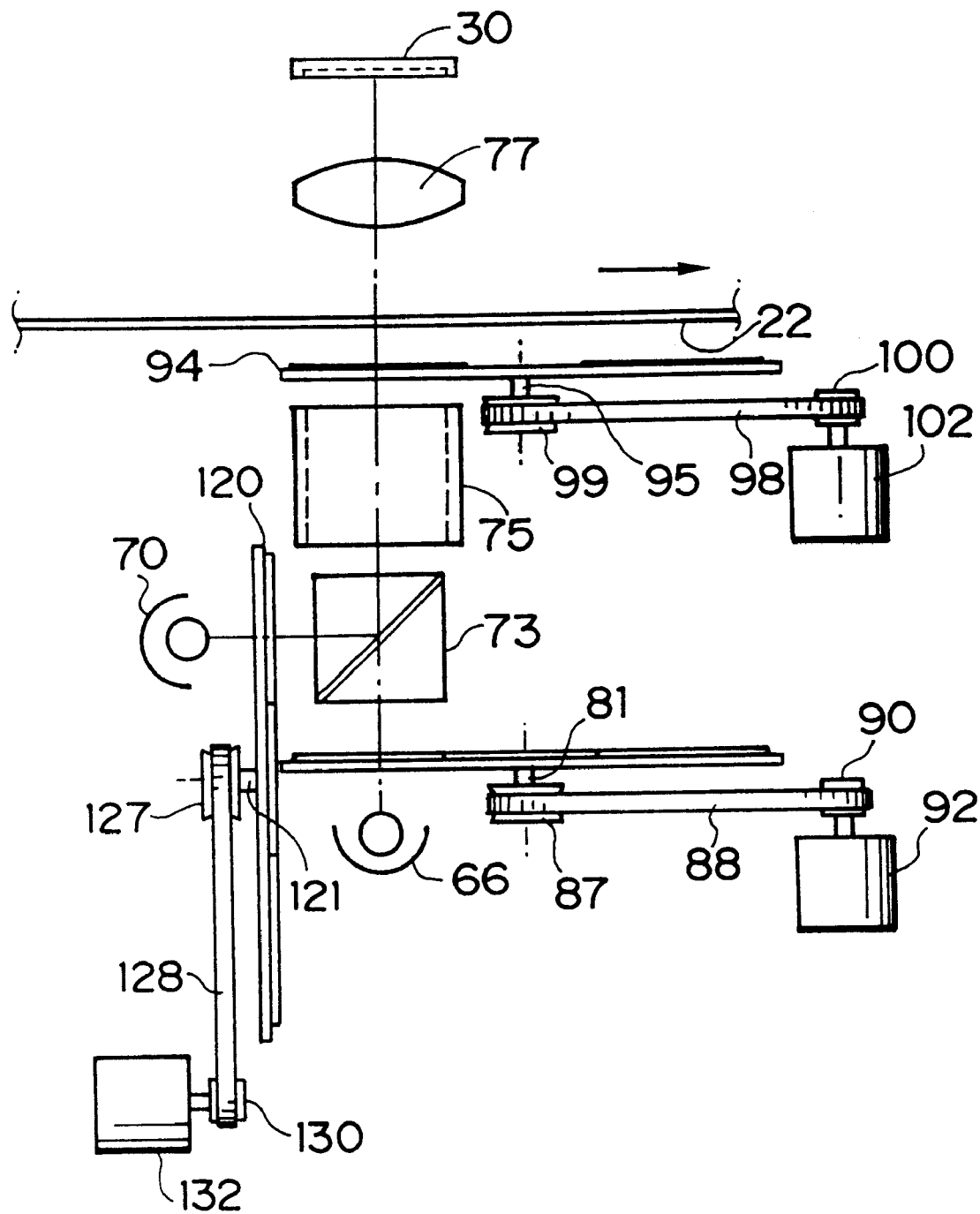
FIG. 5 is a side view showing the placement of a reading optical system that includes a halogen lamp, a filter holder, a half mirror, a diffusion plate, a CCD sensor and the like according to the first embodiment of the present invention.

FIGS. 3 to 5 show the schematic structure of the optical system of the CCD scanner 14. This optical system is provided with a halogen lamp 66 (a visible light source) for emitting white light to serve as a light source for irradiating light onto the photographic film 22.

The halogen lamp 66 is placed on the transport path of the photographic film 22, near the bottom as seen in the figures, so that the light irradiation direction thereof faces the illumination surface of the photographic film 22. A filter holder 80 for inserting filters and the like onto the optical path, as described below, is provided near the lamp.

The filter holder 80 is rotatably supported by a rotating shaft 81. Filters 82R, 82G, and 82B for each of the colors red (R), green (G), and blue (B) are provided on the same circumference centered on the axial center of the rotating shaft 81, as are an empty portion 84 and a shutter 86 for enabling light irradiated onto the photographic film 22 to be shielded without the halogen lamp 66 having to be turned off.

A gear 87 provided on the distal end side of the rotating shaft 81 is linked via a timing belt 88 and a pinion gear 90 to a filter holder drive motor 92. The filter holder drive motor 92 is connected to an unillustrated control circuit portion enabling the angle of rotation to be controlled.

As a result, the position of the filter holder 80 is changed by the rotation of the filter holder drive motor 92 so that either the filter 82R, 82G, 82B, or the shutter 86 are positioned on the optical path of the halogen lamp 66. This allows the illumination light (white light) from the halogen lamp 66 to be switched to any of red light, green light, or blue light, or to be shielded.

Above the filter holder 80 is provided a half mirror 73 along the optical axis of the halogen lamp 66 on the optical path from the halogen lamp 66 to the photographic film 22. The half mirror 73 is provided with a function of transmitting or reflecting light using a light polarizing surface. In this case, the illumination light from the halogen lamp 66 passes through the mirror face of the half mirror 73 and is directed towards the photographic film 22.

A halogen lamp 70 (a light source for non-visible light) is provided to the top left of the halogen lamp 66 as seen in the drawings. Illumination light from the halogen lamp 70 is reflected by the mirror surface of the half mirror 73 that is positioned in the direction of illumination so that this light has the same optical axis as the halogen lamp 66, and is directed towards the photographic film 22.

As is shown in FIG. 4, a filter holder 120 is placed in the vicinity of the lamp of the halogen lamp 70, and is rotatably supported by a rotating shaft 121 in the same way as the above filter holder 80. Note that FIG. 4 shows the vicinity of the halogen lamp 70 shown in FIG. 3, and illustrations of the filter holder 120 and the like are omitted from FIG. 3.

In the filter holder 120, a filter 122IR for infrared light (IR), an empty portion 124, and a shutter 126 for enabling light irradiated onto the photographic film 22 to be shielded without the halogen lamp 70 having to be turned off are provided on the same circumference centered on the axial center of the rotating shaft 121.

A gear 127 provided on the distal end side of the rotating shaft 121 is linked via a timing belt 128 and a pinion gear 130 to a filter holder drive motor 132. The filter holder drive motor 132 is connected to an unillustrated control circuit portion enabling the angle of rotation to be controlled.

As a result, the position of the filter holder 120 is changed by the rotation of the filter holder drive 132 so that either the filter 122IR or the shutter 126 are positioned on the optical path of the halogen lamp 70. This allows the illumination light (white light) from the halogen lamp 66 to be switched to infrared light or to be shielded.

A mirror box 75 is provided above the half mirror 73 to suppress divergence of the illumination light. Light from the halogen lamp 66 or the halogen lamp 70 travels through the mirror box 75 and is directed towards the photographic film 22.

A diffusion plate turret 94 for inserting a diffusion plate described below onto the optical path is further provided in the vicinity of the photographic film 22 above the mirror box 75.

The diffusion plate turret 94 is rotatably supported by a rotating shaft 95, and diffusion plates 96A, 96B, and 96C, each having a different degree of diffusion, as well as an empty portion 97 are provided on the same circumference centered on the axial center of the rotating shaft 95. In the same way as for the filter holders 80 and 120, a gear 99 provided on the distal end side of the rotating shaft 95 is linked via a timing belt 98 and a pinion gear 100 to a diffusion plate turret drive motor 102 whose rotation angle can be controlled.

Note that, in this case, the degree of diffusion of the diffusion plates 96A, 96B, and 96C increases in that order.

Consequently, the rotation position of the diffusion plate turret 94 can be changed by the diffusion plate turret drive motor 102 so that the diffusion plates 96A, 96B, 96C, and the empty portion 97 can be positioned on the optical path of the halogen lamp 66 and the degree of diffusion of the illumination light can be switched. Moreover, the extent of the diffusion of the light emitted from the mirror box 75 is changed in accordance with the degree of diffusion of each diffusion plate and that diffused light is then irradiated onto the photographic film 22.

When infrared light is irradiated from the halogen lamp 70, the empty portion 97 is chosen in the diffusion plate turret 94, and this infrared light strikes the photographic film 22 without undergoing the diffusion action of the diffusion plates.

In contrast, on the opposite side of the light source portion with the photographic film 22 that has been carried into position by a negative carrier 74 sandwiched in between, there are provided on the optical axes of the halogen lamp 66 and the halogen lamp 70 a lens unit 77 having a spherical surface (or a non-spherical surface) for focusing light transmitted through a frame image and a CCD sensor 30 in that order.

The lens unit 77 is a zoom lens formed from a plurality of lenses and is designed to focus the light transmitted through the photographic film 22 in a predetermined position. The CCD sensor 30 is placed in this predetermined position.

The CCD sensor 30 is an area type sensor in which a plurality of light detecting pixels are arranged in a matrix pattern (a 2-dimensional pattern) along the width of the photographic film 22 and along the direction of transportation of the photographic film 22. The CCD sensor 30 has the function of accumulating charges in accordance with the light received by each pixel.

As a result, the transmission light of each of the R, G, and B colors transmitted through a frame image on the photographic film 22, or alternatively, infrared light is focused over substantially the entire pixel range of the CCD sensor 30 by the lens unit 77 for each frame image and is then read electrically.

The operation of the present embodiment will now be described.

An operator inserts a photographic film 22 into a negative carrier (film carrier) 74. When a scratch erasure method is selected and an instruction to start reading the frame image is given using the keyboard 16K of the image processing section 16, the transportation of the photographic film 22 is begun by the negative carrier 74. The prescan is performed in this transportation. Namely, while the photographic film 22 is being transported at a comparatively high speed, the CCD scanner 14 reads not only the frame image but also various types of data outside the image recording area of the photographic film 22. Note that the read image is displayed on a monitor 16M.

Next, fine scan reading conditions are set for each frame image based on the results of the prescan of each frame image. Once setting of the fine scan reading conditions has been completed for all frame images, the photographic film 22 is transported in the reverse direction to that during the prescan and the fine scanning of each frame image is carried out.

At this time, because the photographic film 22 is being transported in the reverse direction to that of the prescan, the fine scanning is performed in order from the last frame to the first frame. Moreover, the transporting speed for the fine scan is set slower than that of the prescan and the resolution of the reading increases proportionately.

Furthermore, because the condition of the image (for example, the aspect ratio of the picked up image, the photographic state i.e. under, normal, over, or super over, the presence of strobe photography, or the like) is understood from the prescan, the image can then be read under the proper reading conditions.

In addition, during the fine scan, a scratch erasure operation is performed in accordance with the film scratch erasure method for the film previously selected.

Namely, if the scratch erasure method using infrared light is selected, irradiated light of each color R, G, and B passes through the half mirror 73, and is irradiated onto the photographic film 22 after divergence of the light amounts has been suppressed by the light passing through the mirror box 75. After the light has passed through the film, it is focused by the lens unit 77 on the CCD sensor 30. Each frame image is read thus. Thereafter, light is emitted from the halogen lamp 70 and, as the infrared light is irradiated thereon, scratching on the film surface or dust or the like on the optical path is read by the CCD sensor 30. Image correction is then performed in the image processing section 16 on the images read in each of R, G, and B color light.

If the scratch erasure method using diffused light is selected, the fine scan is performed only in the R, G, and B color light without detection of the scratches using infrared light being performed. At the same time, the irradiated light is diffused by a diffusion plate and is read by the CCD sensor 30 so that scratches on the film surface are made to no longer stand out.

In this way, processing can be performed which matches the print conditions. Namely, when priority is given to image quality rather than processing speed, scratch detection using infrared light is performed and the scratches are accurately corrected, while if priority is given to the processing speed even if the effects of scratching on the image are somewhat obvious, scratch erasure is carried out by diffused light using a diffusion plate.

Moreover, in the present embodiment, a plurality of diffusion plates are provided (i.e. the diffusion plates 96A, 96B, and 96C). The selection of which of these to use can be made using the keyboard 16K, in the same way as the selection of the erasure method.

In this case, after scratch erasure using diffused light has been selected, if the diffusion plate 96C, which has a high degree of diffusion, is then selected, it is possible to increase the scratch erasure effect to some extent (although not to the same degree as when the image is corrected using infrared light) while maintaining a fast processing speed. If the diffusion plate 96A, which has a low degree of diffusion, is selected, processing can be carried out with the maximum priority given to the processing speed.

As described above, in the present embodiment, because a structure is provided in which a method for erasing scratching on the surface of a film using diffused light or infrared light can be selected, image processing that matches the desired printing conditions can be achieved. Moreover, by choosing a diffusion plate that matches the printing conditions from among a plurality of diffusion plates having different degrees of diffusion, even more precise processing conditions can be set beyond simply balancing processing speed with image erasure effect, enabling a variety of printing conditions to be met.

In addition, because the optical axes of the halogen lamp 66 and the halogen lamp 70 are made the same by the half mirror 73, the light from each is irradiated onto the photographic film 22 from the same optical path. Therefore, mispositioning when an image is read by each of the light rays is reduced and the image correction of defect portions is made even more accurate. In addition, because there is no need to provide separate optical paths for each light source, the overall light source section can be made smaller.

Note that, in the present embodiment, a description was given of a structure in which the scratch erasure method was selected manually, however, it is also possible to use a structure in which the scratch erasure method is selected automatically on the basis of the density of the image obtained from the prescan, for example.

In this case, when image information obtained from the prescan is processed in the image processing section 16, the degree of the image density is determined based on density information (i.e. a threshold value) set in advance. When the frame image has a low density, scratch detection and scratch correction using infrared light is carried out, while, when the frame image has a high density, scratch erasure using diffused light is carried out.

As a result, in comparison with when an image is read always using the same one of these scratch erasure methods, because processing is performed while balancing the processing speed with the scratch erasure effect, highly efficient image processing can be achieved.

In the same way, when selecting the diffusion plate, it is possible to automatically select a diffusion plate in accordance with the image density determined during the prescan as described above. For example, for normal image density, the diffusion plate 96B, whose degree of diffusion is at the intermediate level, can be positioned on the optical path. When the image density is low, the diffusion plate 96C, whose degree of diffusion is high, can be positioned on the optical path, and when the image density is high, the diffusion plate 96A, whose degree of diffusion is low, can be positioned on the optical path. As a result, the switching of the diffusion plates and the use of infrared light can be performed in appropriate combinations in accordance with the density.

When selecting the diffusion plates 96A, 96B, and 96C, it is also possible to use a selection method in which the diffusion plate 96C having a high degree of diffusion is placed on the optical path when reading an image using illumination light and the diffusion plate 96A having a low degree of diffusion is placed on the optical path when reading an image using infrared light. The result of this is that, while not to the same extent as the illumination light, unevenness in the amounts of light is reduced with the infrared light only weakly diffused. Therefore, it is possible, for example, to reduce differences in the shading shape of each image when performing shading correction of each of the images read with each of the different lights, and thus suppress color unevenness and the like appearing on the image.

Moreover, the mechanism for switching between the plurality of diffusion plates provided is not limited to a turret type (rotating type) mechanism as in the present embodiment. Various modes can be used, such as a sliding plate in which a plurality of diffusion plates have been provided. This sliding plate is moved parallel to the surface of the film so that the diffusion plates are positioned on the optical axis.

As a further method for changing the degree of diffusion of the illumination light, it is possible to apply a structure different to that of the present embodiment, in which a selection is made from a plurality of diffusion plates. For example, it is also possible to alter the degree of diffusion using a mirror box.

Figure 6:
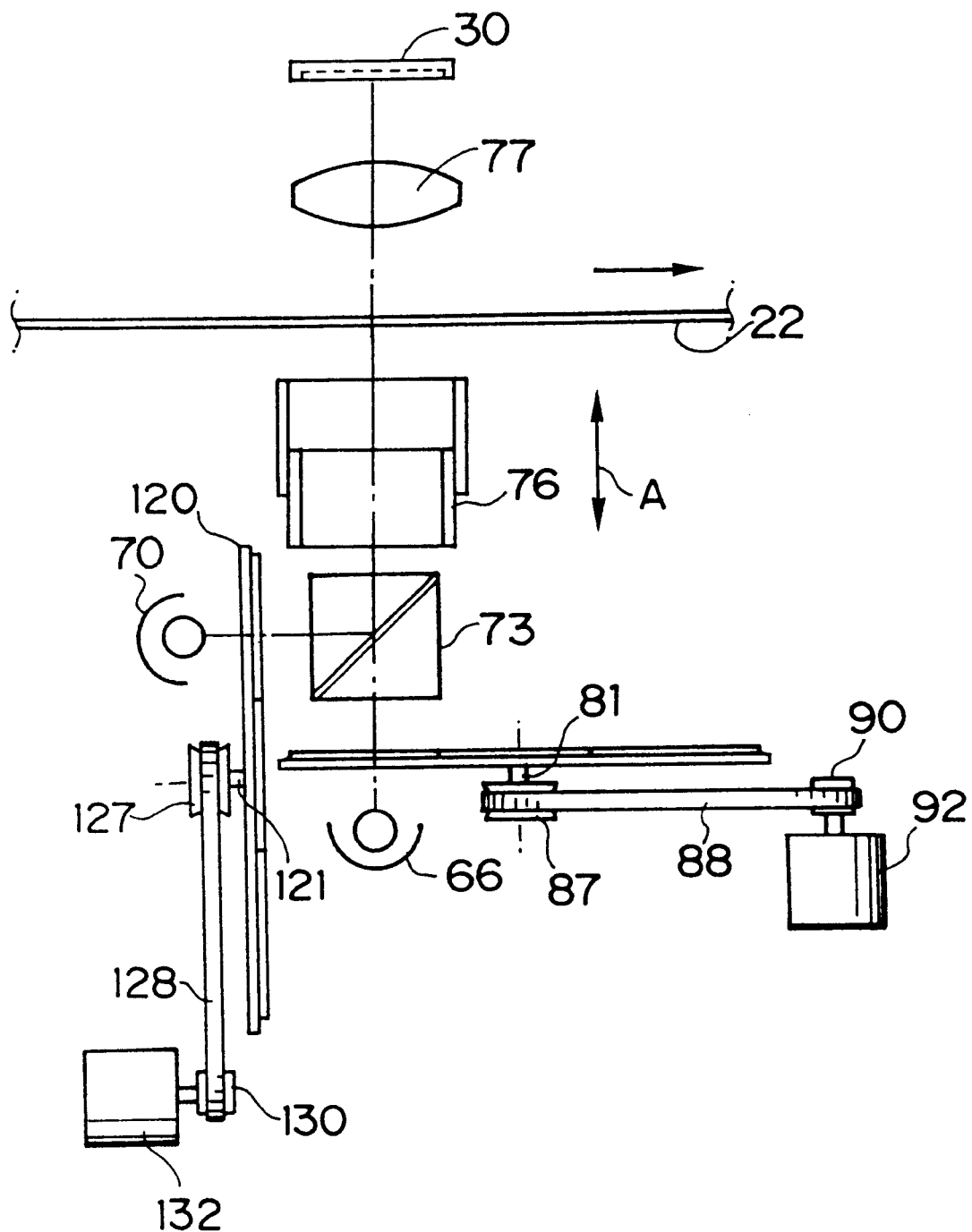
FIG. 6 is a side view showing a modified example of the first embodiment in which a mirror box is adapted as a means for altering the degree of diffusion of the illumination light.

FIG. 6 shows an example of this. In place of the mirror box 75 shown in FIG. 4, a mirror box 76 is provided in which two mirror box portions having different exterior sizes are joined together vertically.

This mirror box 76 is supported so that each mirror box portion can slide in the direction of the optical axis (the direction shown by the arrow A in the figure) thereby allowing the area of the mirror surface (light reflecting surface) inside the box to be changed. As a result of this, the state of reflection of the illumination light irradiated into the mirror box 76 is changed in accordance with the size of the mirror surface, enabling the degree of diffusion to be changed when light is emitted.

In addition to the mechanical parts such as the diffusion plates described hitherto, it is also possible to change the degree of diffusion using a liquid crystal device.

Figure 7:
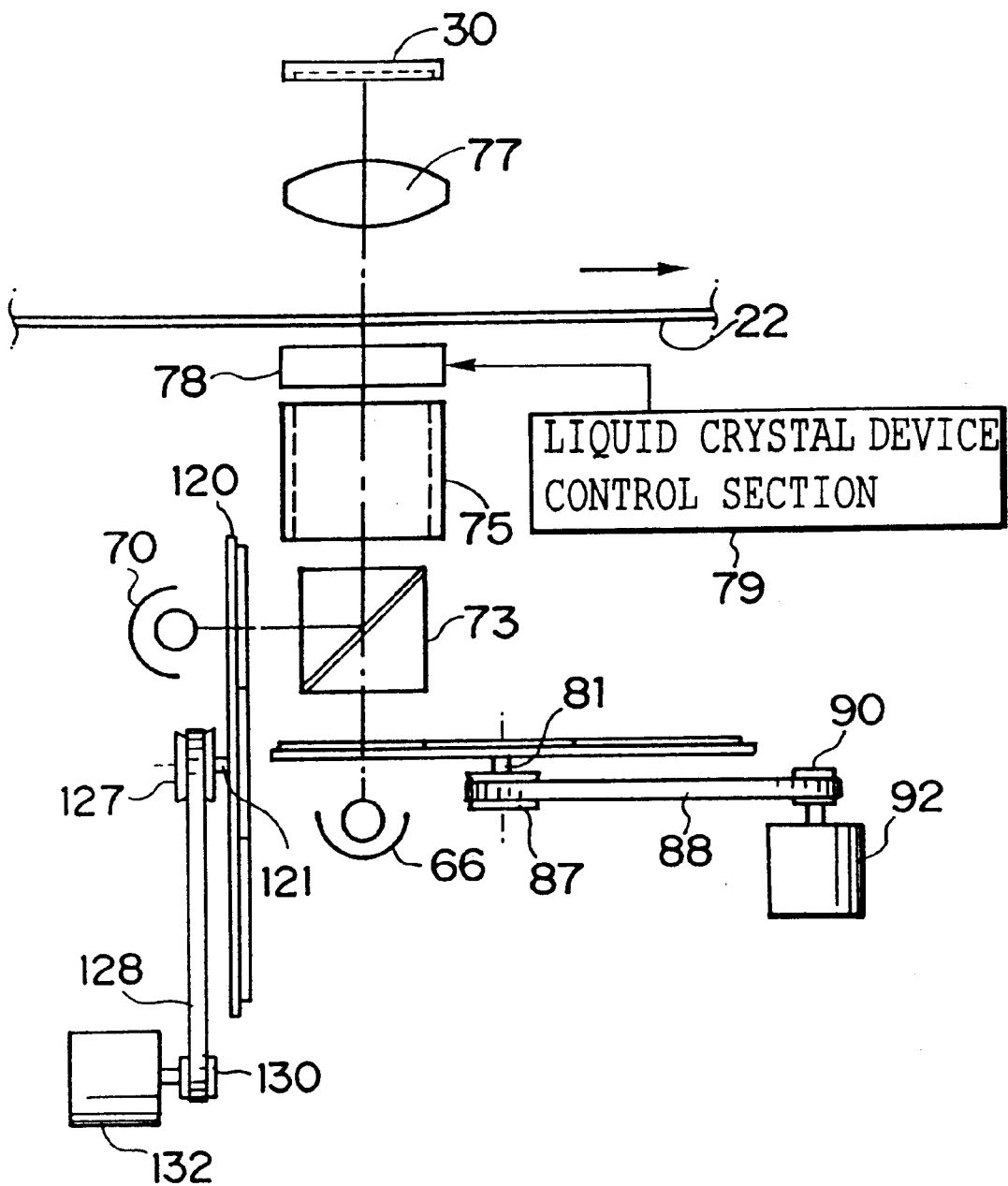
FIG. 7 is a side view showing another modified example of the first embodiment in which a liquid crystal device is adapted as a means for altering the degree of diffusion of the illumination light.

An example of this is shown in FIG. 7. In place of the diffusion plate turret 94 shown in FIG. 4, a polymeric dispersion liquid crystal device 78 is provided in order to change the degree of diffusion.

High polymeric dispersion liquid crystal has a structure in which the liquid crystal is in the shape of small droplets and is dispersed in a resin medium. If the mean refractive index of the liquid crystal small droplets is different to the refractive index of the resin medium, the liquid crystal small droplets cause light scattering in the visible wavelength regions. If voltage is applied so as to arrange the liquid crystal in the direction of the electric field, thereby changing the refractive index of the liquid crystal small droplets to a refractive index which is in a direction parallel to the liquid crystal molecules so as to become a value close to the refractive index of the resin medium, the polymeric dispersion liquid crystal becomes transparent.

In this case, the polymeric dispersion liquid crystal device 78 is connected to a liquid crystal device control section 79 for controlling the applied voltage. By changing the voltage using this liquid crystal device control section 79, the illumination light irradiated to the liquid crystal device can be changed into transparent light or diffused light in accordance with the change in the refractive index of the liquid crystal small droplets.

By using a liquid crystal device in the structure for altering the degree of diffusion, the structure can be simplified, as there is no need for a mechanical drive mechanism or the like.

Furthermore, in the present embodiment, a description is given of a structure in which the illumination system for reading an image includes the halogen lamp 66 for illumination light and the halogen lamp 70 for infrared light as separate light sources. However, by adding an infrared light filter (the filter 1221R) to the filter holder 80 in which each of the R, G, and B color filters are provided, it is possible to extract infrared light as well from the halogen lamp 66. Accordingly, it is not absolutely necessary to provide the aforementioned two separate light sources. Moreover, in this case, because the half mirror used for the halogen lamp 70 also becomes unnecessary, the structure of the illumination system can be simplified even further.

Moreover, the present invention is not limited to a CCD scanner which uses the area type CCD sensor 30, as in the present embodiment, and may also be applied to a linear CCD scanner which reads an image while transporting the film using a line type CCD sensor.

(Second Embodiment)

The second embodiment of the present invention will be described next. The structure of this second embodiment is substantially the same as that described for the above first embodiment. Therefore, the same structural parts are given the same descriptive symbols and a description of their structure is omitted.

Figure 8:
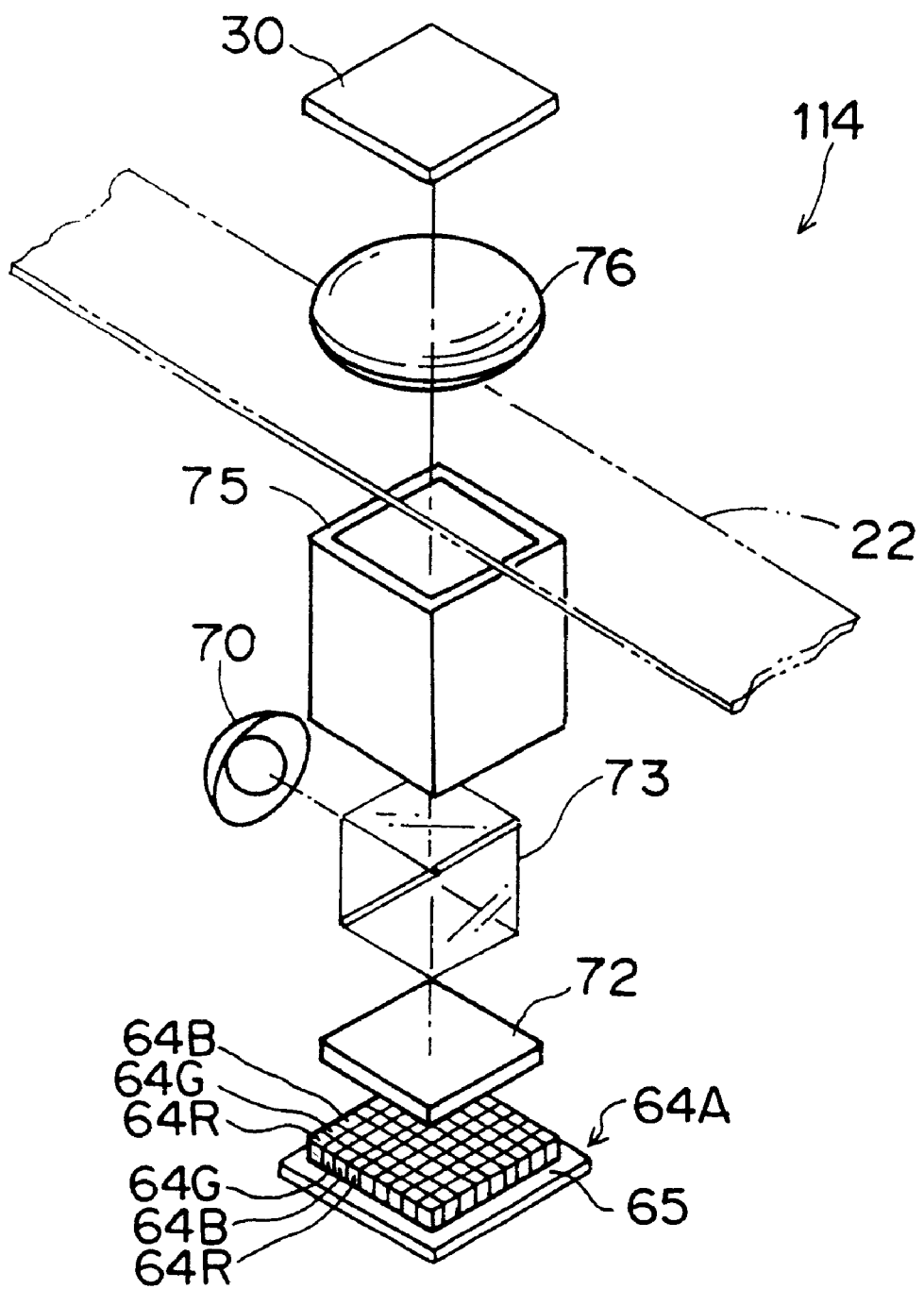
FIG. 8 is a perspective view showing the schematic structure of the optical system of a CCD scanner according to the second embodiment of the present invention.

The schematic structure of the optical system of a CCD scanner 114 is shown in FIG. 8. This optical system includes an LED chip group 64A in which a plurality of LED chips 64R, 64G, and 64B are grouped together for generating light in each of red (R), green (G), and blue (B) colors. This optical system is also provided with an unillustrated light source for irradiating light onto the photographic film 22.

The LED chip group 64A is formed by the LED chips 64R, 64G, and 64B being arranged on an aluminum base plate 65 at a high density level in a planar shape (in the sequence R, G, B of the LED chip units) along the direction in which the photographic film 22 is transported (the longitudinal direction) and along the transverse direction. The generation of light in the LED chips is controlled so that light is generated by switching between each color unit. As a result, light of each color R, G, and B that has an extremely small unevenness in the amount of light between each color is emitted from the LED chip group 64A.

Note that other modes may be used as the method of arranging the LED chips 64R, 64G, and 64B in addition to that described above. For example, the LED chips may be arranged in row units formed in straight lines in either the transverse direction or in the direction in which the photographic film 22 is transported for each color, so that these rows repeated in the sequence R, G, and B.

The LED chip group 64A is placed below the transport path of the photographic film 22, as seen in the figures, such that the direction of irradiation faces the irradiation surface of the photographic film 22. A diffusion plate 72 for diffusing the light irradiated from the LED chip group 64A is placed in the vicinity of the light generating surface. Above the diffusion plate 72, a half mirror 73 is provided along the optical axis of the LED chip group 64A on the optical path from the LED chip group 64A to the photographic film 22. Light irradiated from the LED chip group 64A passes through the mirror surface of the half mirror 73 and is directed towards the photographic film 22.

Figure 9:
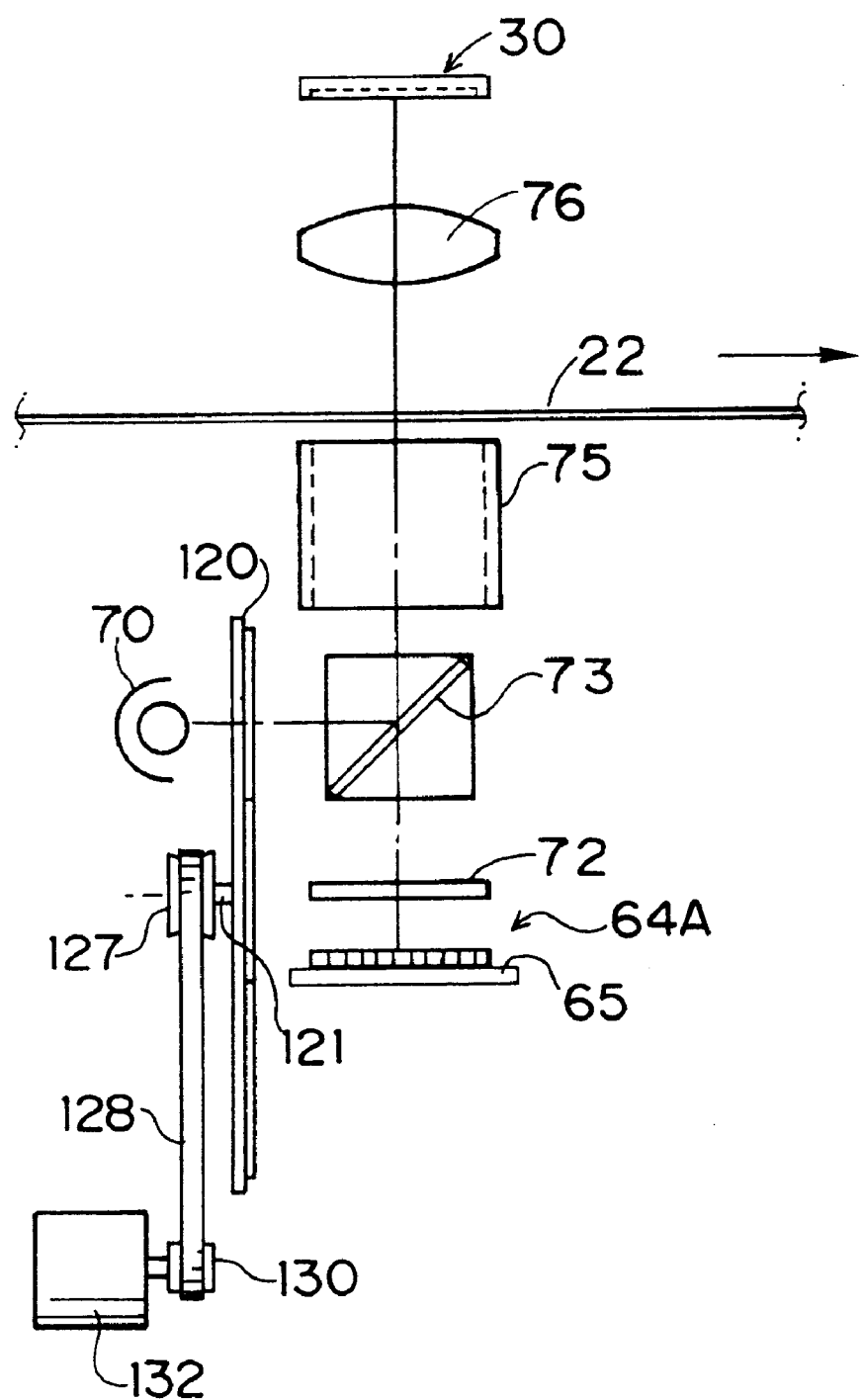
FIG. 9 is a side view showing the placement of a reading optical system that includes an LED chip group, a diffusion plate, a half mirror, a halogen lamp, a filter holder, a mirror box, a CCD sensor and the like according to the second embodiment of the present invention.

A halogen lamp 70 is further provided at the upper left of the LED chip group 64A as seen in the figure. The light irradiated from this halogen lamp 70 is also changed into infrared light by the filter 122IR of the filter holder 120, in the same way as in the first embodiment (see FIG. 9). It is then reflected by the mirror surface of the half mirror 73 positioned in the direction of irradiation so as to match the optical axis of the LED chip group 64A, and is directed towards the photographic film 22.

A mirror box 75 for suppressing divergence of the light emitted from the half mirror 73 is provided above the half mirror 73. Light from the LED chip group 64A or from the halogen lamp 70 passes through this mirror box 75 and is irradiated onto the photographic film 22.

Consequently, when the LED chip group 64A generates light in each of the colors R, G, and B, the light of each color is diffused by the diffusion plate 72 and then passes through the half mirror 73. It is then irradiated onto the photographic film 22 via the mirror box 75.

Moreover, light irradiated from the halogen lamp 70 and changed into infrared light by being passed through the filter 1 22IR is reflected by the half mirror 73 so as to follow the same optical path as the illumination light. It then passes through the mirror box 75 and reaches the photographic film 22.

Thus, in the CCD scanner 114 of the second embodiment, because the diffusion plate 72 for diffusing the illumination light in the visible light regions is provided only on the optical path of the LED chip group 64A, only the illumination light is changed into diffused light. Therefore, unevenness in the amount of light on the film surface when an image is read using illumination light can be suppressed. In addition, because infrared light is irradiated without being diffused, it is possible to accurately detect those light scattering portions caused by scratching or the like, and the defect portion detection capability is improved.

Moreover, because a plurality of LED chips 64R, 64G, and 64B for generating light in each of red (R), green (G), and blue (B) colors are grouped together in an arrangement to form an LED chip group 64A, and because this LED chip group 64A is placed near the diffusion plate 72, the amount of light, from among the illumination light emitted as divergent light from the LED chip group 64A, that strikes the diffusion plate 72 is increased. Therefore, in the present embodiment which uses LED chips that do not generate as much light as a halogen lamp or the like, it is possible to effectively utilize the light from the light source, similarly to the first embodiment.

(Third Embodiment)

The third embodiment of the present invention will be described next. The structure of this third embodiment is substantially the same as that described for the above first embodiment. Therefore, the same structural parts are given the same descriptive symbols and a description of their structure is omitted.

Figure 10:
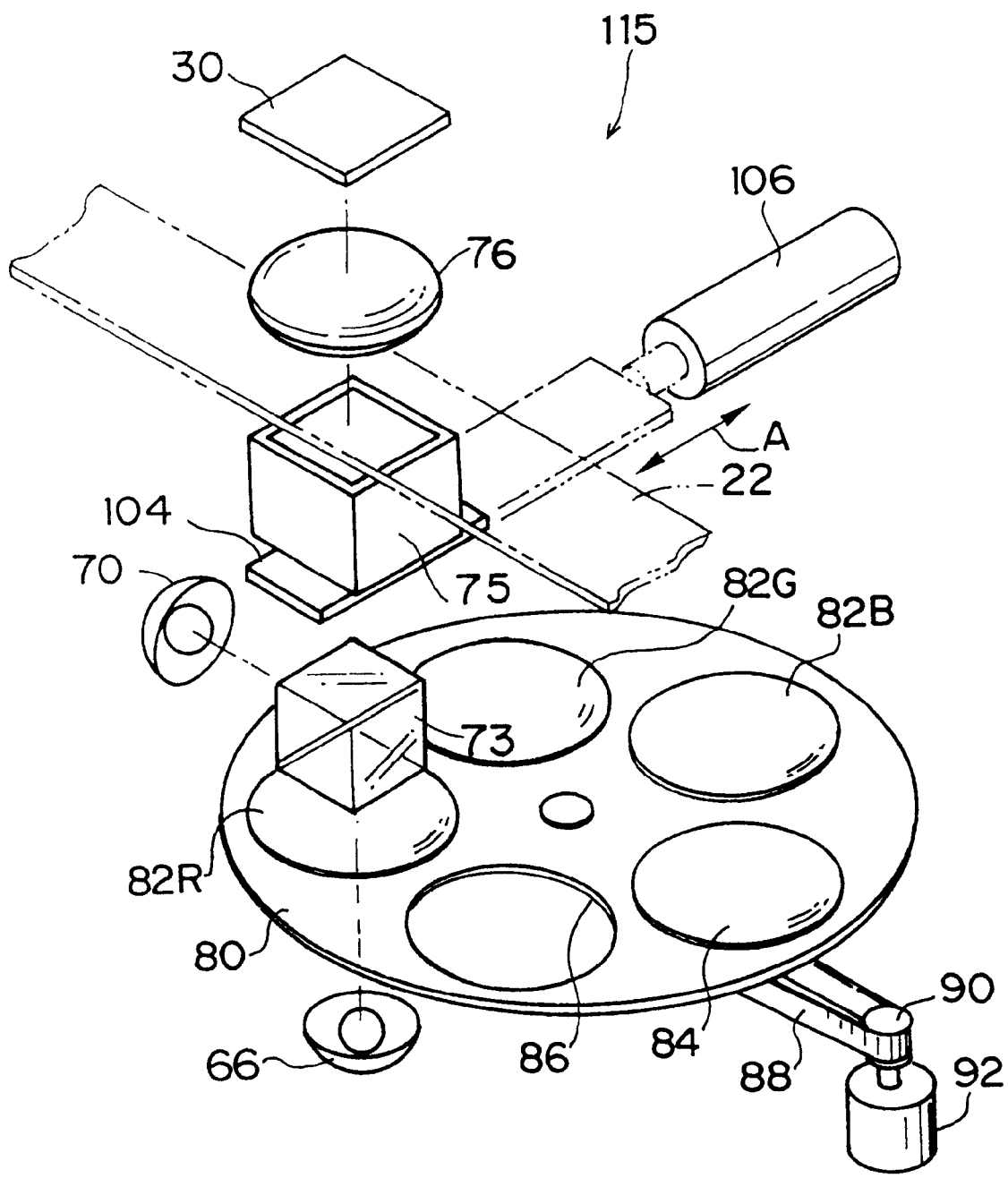
FIG. 10 is a perspective view showing the schematic structure of the optical system of a CCD scanner according to the third embodiment of the present invention.
Figure 11:
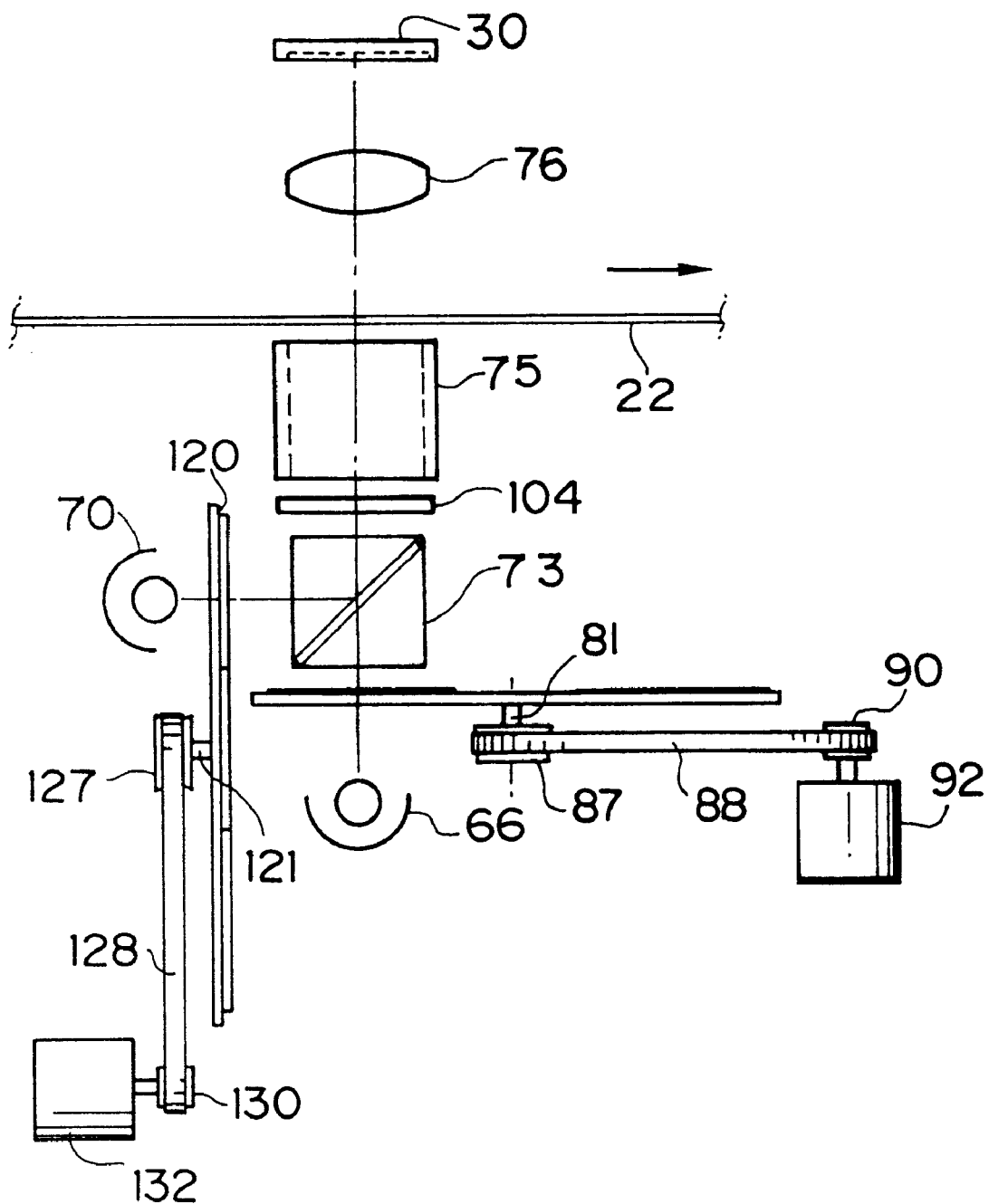
FIG. 11 is a side view showing the placement of a reading optical system that includes a halogen lamp, a filter holder, a half mirror, a diffusion plate, a mirror box, and a CCD sensor according to the third embodiment of the present invention.

The schematic structure of the optical system of a CCD scanner 115 according to the third embodiment of the present invention is shown in FIGS. 10 and 11.

In this optical system, the light source for illumination light for reading an image on the photographic film 22 is set as the same halogen lamp 66 as in the first embodiment. This halogen lamp 66 is provided below the transport path of the photographic film 22 as seen in the figures so that the irradiation direction faces the irradiation surface of the photographic film 22.

The same filter holder 80 as in the first embodiment is also provided near the lamp so that illumination light (white light) from the halogen lamp 66 can be changed into each of the colors red, green, and blue.

A diffusion plate 104 for raising the degree of diffusion of the illumination light is not provided in the vicinity of the halogen lamp 66, as it is in the second embodiment, but is instead placed on the optical path of the halogen lamp 66 between the half mirror 73 and the mirror box 75.

Here, the diffusion plate 104 is structured so that one end of the diffusion plate 104 is fixed to a plunger 106 so that it is able to be moved in a direction (the direction indicated in the figure by the arrow A) orthogonal to the direction in which the photographic film 22 is transported. When illumination light is irradiated onto the photographic film 22, the diffusion plate is positioned on the optical path (i.e. at the position indicated by the solid lines in the figure) so as to diffuse the illumination light. When infrared light is irradiated, the diffusion plate 104 is withdrawn from the optical path (i.e. to the position indicated by the two-dot chain line in the figure) so as not to diffuse the light.

Therefore, illumination light from the halogen lamp 66, which is changed into each of the R, G, and B colors by the filters 82R, 82G, and 82B, passes through the half mirror 73 and is then diffused by the diffusion plate 104. It then passes through the mirror box 75 and is irradiated onto the photographic film 22. In the case of infrared light emitted from the halogen lamp 70, the infrared light is reflected by the half mirror 73 and passes through the mirror box 75 without being diffused, and is then irradiated onto the photographic film 22. The respective types light that have passed through the frame images are focused onto the CCD sensor 30 by the lens unit 77 and are read electrically.

In this way, in the present embodiment as well, in which the diffusion plate 104 is placed on the common optical path of the halogen lamp 66 and the halogen lamp 70 such that the diffusion plate 104 can be moved either onto the optical path or away from the optical path to match the light source used, it is possible to easily alter the degrees of diffusion of the illumination light and the infrared light, thereby improving the capability of detecting defect portions on the photographic film 22 and the correction processing capability.

Note that, in the present embodiment in which halogen lamps are used as light sources, because a sufficient amount of light is generated compared with LED chips, it is not necessary to place the diffusion plate near the halogen lamp, as in the second embodiment. Consequently, the degree of freedom of design as regards the positioning of each member and the like forming the optical system can be increased.

However, it is possible, in the present embodiment as well, to use an LED chip group 64A in which LED chips for generating light in each of the R, G, and B colors are grouped together, as was described in the second embodiment. Moreover, in this case, in addition to using a structure in which the halogen lamp 66 is replaced by the LED chip group 64A, by combining the use of LED chips which generate light in the infrared wavelength, it is possible to form a single light source structure capable of irradiating R, G, B, and IR light. Accordingly, in the same way as in the above described illumination system which changes the light using filters corresponding to the wavelength of each color, the optical axes of each light source can be matched together without providing the half mirror 73.

The present invention was described as applied to a transmission original such as a photographic film, however, it can also be applied to the image reading of a reflection original.

Moreover, the non-visible light for reading scratching and the like on an image is not limited to infrared light, and it is also possible to apply the present invention to an optical system using ultraviolet light.

To summarize, the image reading device of the present invention enables the reading of an image in accordance with desired print conditions by using different scratch erasure methods for different originals. It also enables the defect detection capability using non-visible light to be improved.

What is claimed is:

1. An image reading device for reading an image recorded on an original in predetermined different color wavelengths, comprising:

a light source for visible light for irradiating light of visible light regions onto a surface of the original in accordance with the color wavelengths so as to read image information of the original;

a light source for non-visible light for irradiating light of non-visible light regions onto a surface of the original in order to detect scratching on the original or dust on the optical path;

an adjustable diffusion member that is provided on an optical path of the light source for visible light and the light source for non-visible light and which makes the amount of light irradiated onto the surface of the original substantially uniform;

and an image processing section for correcting the image information based on image defect portion detection information obtained by an image reading using light from the light source for non-visible light.

2. The image reading device according to claim 1, wherein a preliminary reading of image information of the original is made using light from the light source for visible light and, based on a density of the image obtained from the reading, a switch is made between an image reading using the diffusion member using light from the light source for visible light, and correction of the image information using light from the light source for non-visible light.

3. The image reading device according to claim 2, wherein the diffusion member is provided in the vicinity of the original on the side on which each of the types of light is irradiated.

4. The image reading device according to claim 1, wherein the image reading device comprises: a plurality of the diffusion members which each have a different degree of light diffusion; and a diffusion member switching member which selectively positions the plurality of the diffusion members on the optical path.

5. The image reading device according to claim 4, wherein a preliminary reading is made of image information of the original using light from the light source for visible light, and the plurality of diffusion members are switched based on image density obtained from the reading.

6. The image reading device according to claim 5, wherein a diffusion plate having a high degree of diffusion is placed on the optical path when the image has a low density, and a diffusion plate having a low degree of diffusion is placed on the optical path when the image has a high density.

7. The image reading device according to claim 4, wherein, when using the light source for non-visible light, a diffusion member having a lower degree of diffusion for diffusing light than the diffusion member placed on the optical path when using the light source for visible light is placed on the optical path.

8. The image reading device according to claim 1, wherein the light source for visible light is a plurality of light emitting elements as a group for generating, based on said color wavelengths, light in wavelengths different from each other.

9. The image reading device according to claim 8, wherein the diffusion member is placed only on the optical path of the light source for visible light.

10. The image reading device according to claim 1, wherein the image reading device has a diffusion member placement member for placing the diffusion member on the optical path only when the light source for visible light is used.

11. The image reading device according to claim 1, wherein the image reading device is provided with a light shielding member for selectively shielding the light from the light source for visible light and the light from the light source for non-visible light which is irradiated onto a surface of the original.

12. The image reading device according to claim 1, wherein a preliminary reading of image information of the original is made using light from the light source for visible light and, based on a density of the image obtained from the preliminary reading, the image processing section carries out image correction by at least one of: scratch-erasing image reading effected by making the amounts of light irradiated onto the surface of the original substantially uniform, by diffusing light from the light source for visible light by using the diffusion member; and correction of image information by using light from the light source for non-visible light.

13. The image reading device according to claim 12, wherein a degree of light diffusion by the diffusion member is adjustable.

14. An image reading device for reading an image recorded on an original in predetermined different color wavelengths, comprising:

a light source for visible light for irradiating light of visible light regions onto a surface of the original in accordance with the color wavelengths so as to read image information of the original;

a light source for non-visible light for irradiating light of non-visible light regions onto a surface of the original in order to detect scratching on the original or dust on the optical path;

a reflecting member for adjusting at least one of an optical path of the light source for visible light and an optical path of the light source for non-visible light such that the optical path of the light source for visible light and an optical path of the light source for non-visible light coincide and are irradiated onto the surface of the original;

an adjustable diffusion member that is provided on an optical path between the reflecting means and the original and which makes the amount of light irradiated onto the surface of the original substantially uniform;

and an image processing section for correcting the image information based on image defect portion detection information obtained by an image reading using light from the light source for non-visible light.

15. The image reading device according to claim 14, wherein a preliminary reading of image information of the original is made using light from the light source for visible light and, based on a density of the image obtained from the reading, a switch is made between an image reading using the diffusion member using light from the light source for visible light, and correction of the image information using light from the light source for non-visible light.

16. The image reading device according to claim 14, wherein the image reading device comprises: a plurality of the diffusion members which each have a different degree of light diffusion; and a diffusion member switching member which selectively positions the plurality of the diffusion members on the optical path.

17. The image reading device according to claim 16, wherein a preliminary reading is made of image information of the original using light from the light source for visible light, and the plurality of diffusion members are switched based on image density obtained from the reading.

18. The image reading device according to claim 17, wherein a diffusion plate having a high degree of diffusion is placed on the optical path when the image has a low density, and a diffusion plate having a low degree of diffusion is placed on the optical path when the image has a high density.

19. The image reading device according to claim 16, wherein, when using the light source for non-visible light, a diffusion member having a lower degree of diffusion for diffusing light than the diffusion member placed on the optical path when using the light source for visible light is placed on the optical path.

20. The image reading device according to claim 14, wherein a preliminary reading of image information of the original is made using light from the light source for visible light and, based on a density of the image obtained from the preliminary reading, the image processing section carries out image correction by at least one of: scratch-erasing image reading effected by making the amounts of light irradiated onto the surface of the original substantially uniform, by diffusing light from the light source for visible light by using the diffusion member; and correction of image information by using light from the light source for non-visible light.

21. The image reading device according to claim 14, wherein a degree of light diffusion by the diffusion member is adjustable.

22. An image reading device for reading an image recorded on an original in predetermined different color wavelengths, comprising:

a light source for visible light for irradiating light of visible light regions onto a surface of the original in accordance with the color wavelengths so as to read image information of the original;

a light source for non-visible light for irradiating light of non-visible light regions onto a surface of the original in order to detect scratching on the original or dust on the optical path;

a diffusion member that is provided adjacent to the light source for visible light on an optical path between the light source for visible light and the original, and which makes the amount of light irradiated onto the surface of the original substantially uniform, the diffusion member not being provided on an optical path between the light source for non-visible light and the original;

and an image processing section for correcting the image information based on image defect portion detection information obtained by an image reading using light from the light source for non-visible light.

23. The image reading device according to claim 22, wherein the light source for visible light is a plurality of light emitting elements as a group for generating, based on said color wavelengths, light in wavelengths different from each other.

24. An image reading device for reading an image recorded on an original in predetermined different color wavelengths comprising:

a light generation source that includes a light source for visible light for irradiating light of visible light regions onto a surface of the original in accordance with the color wavelengths so as to read image information of the original, and a light source for non-visible light for irradiating light of non-visible light regions onto a surface of the original in order to detect scratching on the original or dust on the optical path;

an adjusting member that is positioned on the optical path between the light generation source and the original and performs adjustments such that the light from the light generation source is only one of either the visible light or the non-visible light;

a diffusion member for diffusing light that is constructed so as to move onto the optical path between the adjusting member and the original when visible light is being irradiated, and to be able to be withdrawn from the optical path when non-visible light is being irradiated;

and an image processing section for correcting the image information based on image defect portion detection information obtained by an image reading using light from the light source for non-visible light.

* * * * *